(12) United States Patent
Cohen et al.

(10) Patent No.: US 8,438,010 B2
(45) Date of Patent: May 7, 2013

(54) EFFICIENT STEMMING OF SEMITIC LANGUAGES

(75) Inventors: Daniel Cohen, Yehuda (IL); Yigal Shai Dayan, Jerusalem (IL); Josemina Magdalen, Jerusalem (IL); Victoria Mazel, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 921 days.

(21) Appl. No.: 11/951,388

(22) Filed: Dec. 6, 2007

(65) Prior Publication Data

US 2009/0150140 A1 Jun. 11, 2009

(51) Int. Cl.
*G06F 17/27* (2006.01)

(52) U.S. Cl.
USPC .................................................. 704/9

(58) Field of Classification Search ........ 704/9
See application file for complete search history.

(56) References Cited

U.S. PATENT DOCUMENTS

| | | | | |
|---|---|---|---|---|
| 4,862,408 A | * | 8/1989 | Zamora | 1/1 |
| 5,524,066 A | * | 6/1996 | Kaplan et al. | 382/229 |
| 5,708,829 A | * | 1/1998 | Kadashevich et al. | 715/236 |
| 7,072,827 B1 | | 7/2006 | Carmel et al. | |
| 7,409,334 B1 | * | 8/2008 | Shoemaker | 704/8 |
| 2006/0129380 A1 | * | 6/2006 | El-Shishiny | 704/9 |
| 2006/0200338 A1 | * | 9/2006 | Cipollone et al. | 704/4 |
| 2007/0005586 A1 | * | 1/2007 | Shaefer et al. | 707/5 |
| 2007/0255567 A1 | * | 11/2007 | Bangalore et al. | 704/260 |
| 2008/0183696 A1 | * | 7/2008 | Lagunas | 707/5 |
| 2008/0228748 A1 | * | 9/2008 | Fairweather | 707/5 |

OTHER PUBLICATIONS

Jawad Berri; "Knowledge-based Architecture for Free Text Processing"; Source: http://web.archive.org/web/20030407110107/http://afnlp.org/pacling2001/pdf/berri.pdf.

Ezra Daya; "Learning to Identify Semitic Roots"; Source: http://cs.haifa.as.il/~shuly/publications/ezra-thesis.pdf.

Saba Amsalu et al.; "A Complete FS Model for Amharic Morphographemics," Finite-State Methods and Natural Language Processing, Springer, Berlin / Heidelberg, 2006; ; Source: http://www.springerlink.com/content/ph033g388r886227/.

* cited by examiner

*Primary Examiner* — Jakieda Jackson

(74) *Attorney, Agent, or Firm* — Sughrue Mion, PLLC

(57) ABSTRACT

A system for stemming words of Semitic languages, the system including an affix scanner configured to scan a word of a Semitic language for at least one affix according to a predefined scanning sequence and determine if at least one predefined scanning criterion is met, and a stemmer configured to remove the affix from the word if the predefined scanning criterion is met.

24 Claims, 2 Drawing Sheets

EFFICIENT STEMMING OF SEMITIC LANGUAGES

FIELD OF THE INVENTION

The present invention relates to the field of text analysis and word stemming, such as for use with computer-based search engines and document classification systems.

BACKGROUND OF THE INVENTION

Search engines and document classification systems typically rely on the analysis of source document text in the construction of their search indices or classifiers and for subsequent query processing. Morphological analysis of languages can be used to support computer-based applications, such as natural-language text processing required by search engines or machine learning classifiers, by decomposing text input into affixes and lemmas. A common approach to morphological analysis relies on a small number of possible affixes, so that all possible forms for every word can be easily and efficiently synthesized. In languages such as English, French, Spanish, and other European languages, only one affix may be attached to a word in most cases. These affixes may be maintained in a file or database together with a description of their morpho-syntactic meaning. These affix-lists are used in conjunction with predefined lexicons to analyze the words.

Semitic languages such as Hebrew and Arabic are characterized, in most cases, by three-letter roots from which various parts of speech may be formed. For example, the Hebrew root k-t-v, meaning "write," may take various forms such as Ka-ta-v-nu—we wrote
Ka-ta-va—article
Ka-ta-v—he wrote; journalist
Ni-k-to-v—we will write.

Semitic languages are characterized by prodigious word formation, where words are typically formed by applying predefined patterns of vowels, consonants, prefixes, suffixes, and infixes to roots making the naïve approach mentioned above unsatisfactory for automated word analysis of such languages.

Usually, a root includes mostly consonants, while a pattern is expressed as a combination of vowels and consonants, typically represented by special diacritic signs. Thus, in the above example, the following words may be formed from the Hebrew k-t-v root by applying various patterns as follows:

Ka-ta-v-nu (we wrote)=k-t-v+Pattern CaCaCnu
Ka-ta-va (article)=k-t-v+Pattern CaCaCa
Ka-ta-v (he wrote; journalist)=k-t-v+Pattern CaCaC
Ni-k-to-v (we will write)=k-t-v+Pattern NiCCoC where each "C" represents a different letter of the root in the order in which the letters appear in the root. The standard method of Natural Language Processing used for European languages is based on a relatively small set of morphological rules. However, the set of rules required for Semitic languages may be too large and cannot be exhaustive to cover all possible morphological variants.

In one type of analysis known as "stemming", affixes are removed from a word, typically until all affixes have been removed from the word, leaving just the word stem or root. When stemming is applied to the words in a source text document, the identified stems are often used for indexing, classification, or query processing, in place of or in addition to the words themselves.

In Semitic Languages each word may have a large, though limited, number of affixes, and most importantly, these affixes can be appended to each other in a certain order. Unfortunately, as consonants can be either part of a root or an affix, a list of affixes cannot by itself be applied to determine whether a letter is an affix or part of the root. This is illustrated by the following ebresHebrew word (consonants in bold letters):

sha-ba-t—"Saturday"
sha-va-t—"he was striking (participated in a strike)"
she-ba-t—"that daughter"—in this case "she" is a prefix meaning "that" (a relative pronoun)

Since in Hebrew, for example, the diacritic signs representing vowels usually are not written, the same combination of letters (i.e. words) may have various meanings depending on the context.

SUMMARY OF THE INVENTION

The present invention in embodiments thereof discloses novel systems and methods for efficient stemming of words in Semitic languages, such as Hebrew and Arabic, without relying on lexical information.

In one aspect of the present invention a system is provided for stemming words of Semitic languages, the system including an affix scanner configured to scan a word of a Semitic language for at least one affix according to a predefined scanning sequence and determine if at least one predefined scanning criterion is met, and a stemmer configured to remove the affix from the word if the predefined scanning criterion is met.

In another aspect of the present invention the stemmer is configured to re-input the word from which the affix has been removed into the affix scanner if at least one predefined termination criterion is not met.

In another aspect of the present invention the stemmer is configured to output the word from which the affix has been removed as a stem of the word if at least one predefined termination criterion is met.

In another aspect of the present invention the predefined termination criterion is met when the word is of a predefined character length.

In another aspect of the present invention the predefined scanning sequence requires that the word be scanned first to determine if the word includes a prefix that is found in a list of predefined prefixes, and then to determine if the word includes a suffix that is found in a list of predefined suffixes, and finally to determine if the word includes an infix that is found in a list of predefined infixes.

In another aspect of the present invention the predefined scanning criterion is met when the affix is found and the word is of a minimum character length.

In another aspect of the present invention the predefined scanning criterion is met when the affix meets at least one predefined distance criterion from an extent of the word when the affix is found.

In another aspect of the present invention any of the affix scanner and the stemmer are embodied in a computer-readable medium for execution by a computer.

In another aspect of the present invention a method is provided for stemming words of Semitic languages, the method including scanning a word of a Semitic language for at least one affix according to a predefined scanning sequence, determining if at least one predefined scanning criterion is met, and removing the affix from the word if the predefined scanning criterion is met.

In another aspect of the present invention the method further includes performing any of the scanning, determining, and removing steps a plurality of times until at least one predefined termination criterion is met.

In another aspect of the present invention the method further includes outputting the word, from which the affix has been removed, as a stem of the word if at least one predefined termination criterion is met.

In another aspect of the present invention the outputting stem includes outputting if the word is of a predefined character length.

In another aspect of the present invention the scanning step in a first iteration of the scanning, determining, and removing steps includes scanning the word to determine if the word includes a prefix that is found in a list of predefined prefixes, the scanning step in a second iteration of the scanning, determining, and removing steps includes scanning the word to determine if the word includes a suffix that is found in a list of predefined suffixes, and the scanning step in a third iteration of the scanning, determining, and removing steps includes scanning the word to determine if the word includes an infix that is found in a list of predefined infixes.

In another aspect of the present invention the determining step includes determining that the word is of a minimum character length when the affix is found.

In another aspect of the present invention the determining step includes determining that the affix meets at least one predefined distance criterion from an extent of the word when the affix is found.

In another aspect of the present invention for each scan for a given affix type, all affixes of the affix type are removed from the word before the word is subsequently scanned for a different affix type In another aspect of the present invention a computer program is provided embodied on a computer-readable medium, the computer program including a first code segment operative to scan a word of a Semitic language for at least one affix according to a predefined scanning sequence, a second code segment operative to determine if at least one predefined scanning criterion is met, and a third code segment operative to remove the affix from the word if the predefined scanning criterion is met.

In another aspect of the present invention the code segments are operative to performing the scanning, determining, and removing steps a plurality of times until at least one predefined termination criterion is met.

In another aspect of the present invention the computer program further includes a fourth code segment operative to output the word, from which the affix has been removed, as a stem of the word if at least one predefined termination criterion is met.

In another aspect of the present invention the fourth code segment is operative to output the stem if the stem is of a predefined character length.

In another aspect of the present invention the first code segment scanning step in a first iteration of executing the code segments is operative to scan the word to determine if the word includes a prefix that is found in a list of predefined prefixes, the first code segment scanning step in a second iteration of executing the code segments is operative to scan the word to determine if the word includes a suffix that is found in a list of predefined suffixes, and the first code segment scanning step in a third iteration of executing the code segments is operative to scan the word to determine if the word includes an infix that is found in a list of predefined infixes.

In another aspect of the present invention the second code segment is operative to determine that the word is of a minimum character length when the affix is found.

In another aspect of the present invention the second code segment is operative to determine that the affix meets at least one predefined distance criterion from an extent of the word when the affix is found.

In another aspect of the present invention the third code segment is operative for each scan for a given affix type to remove all affixes of the affix type from the word before the word is subsequently scanned for a different affix type.

BRIEF DESCRIPTION OF THE DRAWINGS

The present invention in embodiments thereof will be understood and appreciated more fully from the following detailed description taken in conjunction with the appended drawings in which.

DETAILED DESCRIPTION OF THE INVENTION

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

Figure 1:
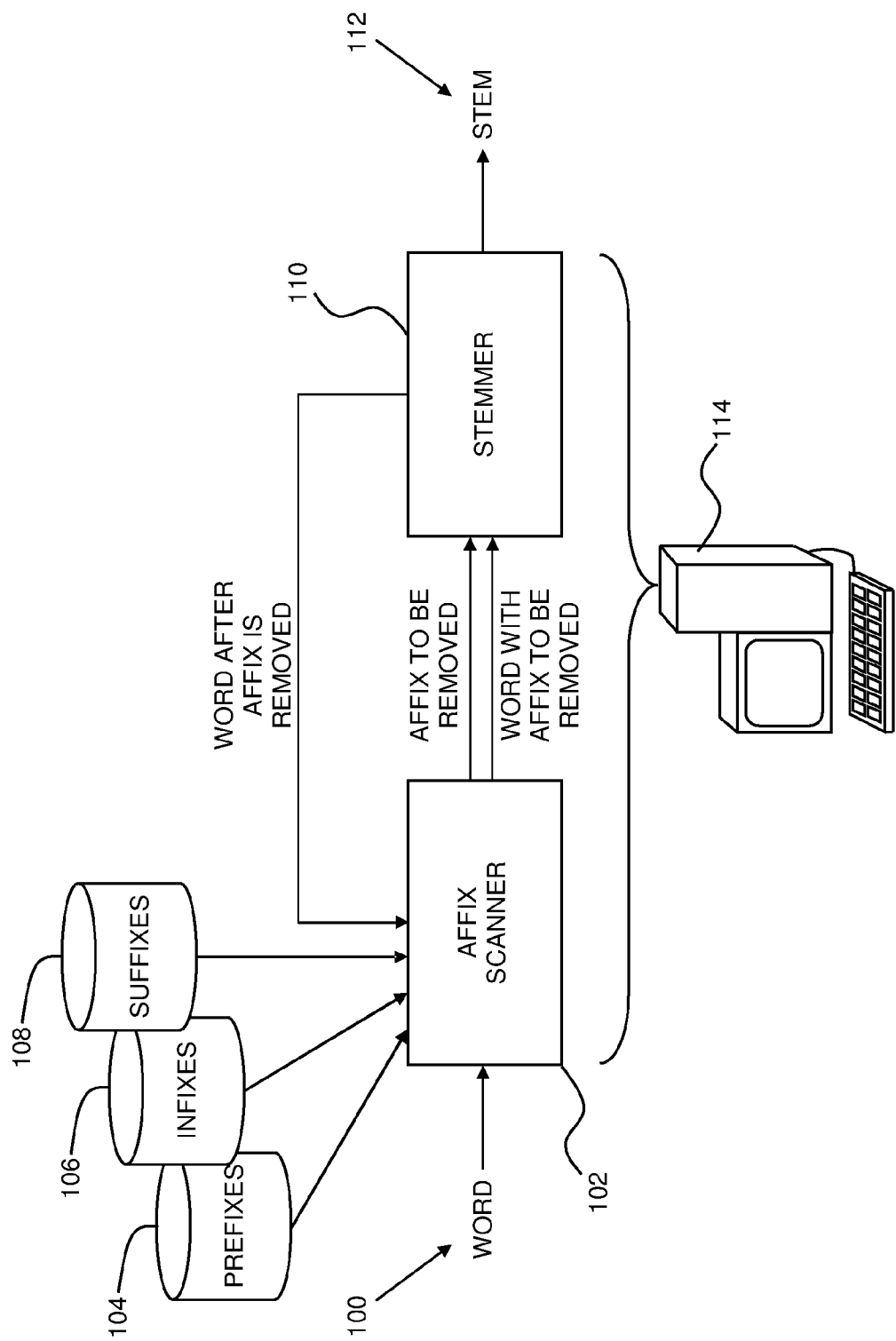
FIG. 1 is a simplified illustration of a system for stemming words of Semitic languages, constructed and operative in accordance with an embodiment of the present invention.

Reference is now made to FIG. 1, which is a simplified illustration of a system for stemming words of Semitic languages, constructed and operative in accordance with an embodiment of the present invention. In the system of FIG. 1, a word 100 from a Semitic language such as Hebrew or Arabic is input into an affix scanner 102. The word may, for example, be from a text document that is to be indexed or classified, or may be from a query of an index that was constructed from Semitic language stems that were derived using the present invention. Affix scanner 102 scans the word for predefined prefixes 104, infixes 106, and suffixes 108, typically employing a predefined scanning sequence and determining if one or more predefined scanning criteria are met. If affix scanner 102 finds an affix in the word, and all applicable predefined scanning criteria are met, a stemmer 110 removes the affix from the word. If one or more predefined termination criteria are not met, stemmer 110 re-inputs the word from which the affix has been removed into affix scanner 102. If the predefined termination criteria are met, whatever remains of the word is considered to be a stem 112. The stem may then be used for applications such as indexing and/or classification of text documents and/or query processing in accordance with conventional techniques.

The elements shown in FIG. 1 are preferably embodied in a computer-readable medium for execution by a computer 114 or are otherwise accessible to computer 114.

Figure 2:
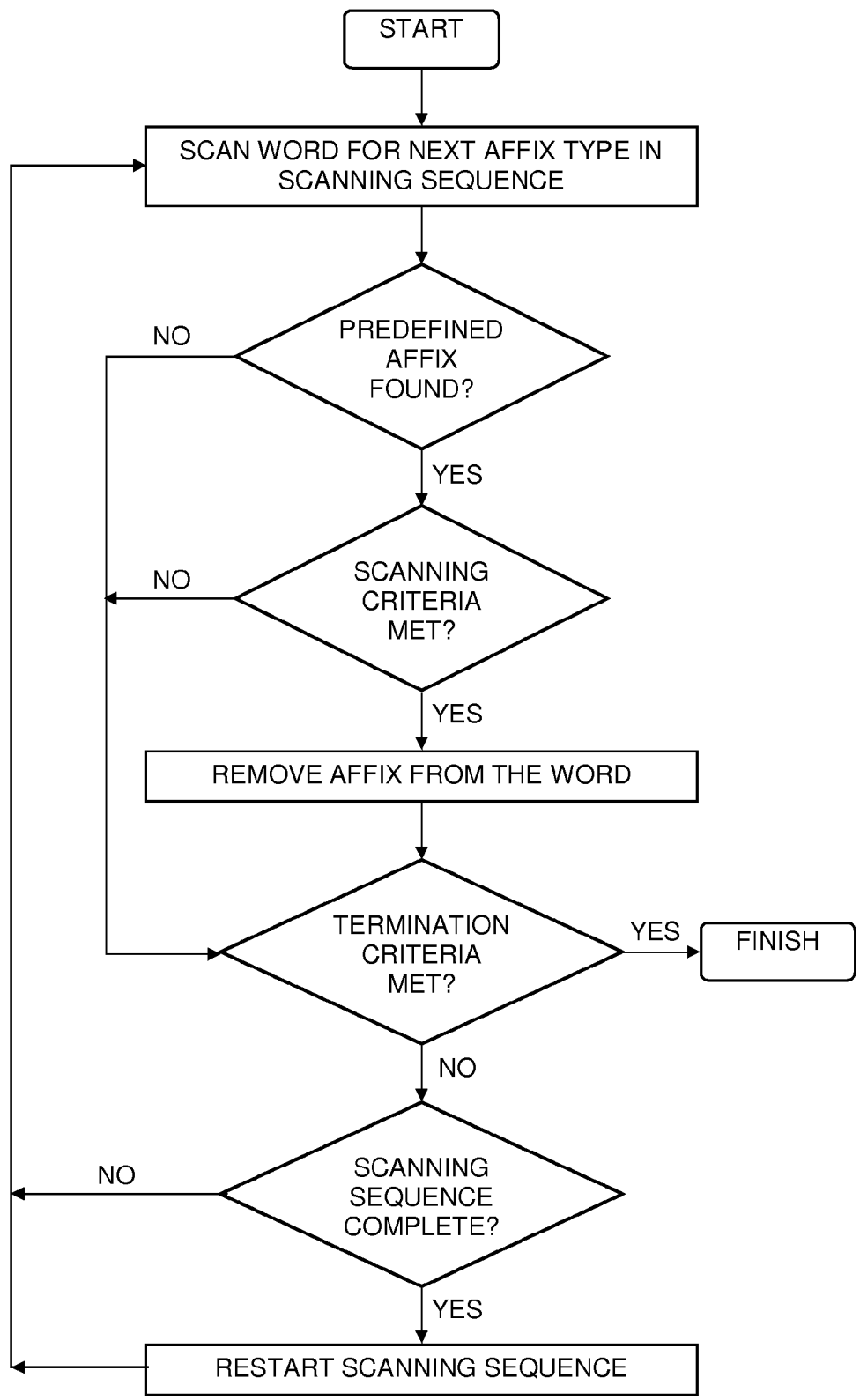
FIG. 2 is a simplified flowchart illustration of a method for stemming words of Semitic languages, operative in accordance with an embodiment of the invention.

Reference is now made to FIG. 2, which is a simplified flowchart illustration of a method for stemming words of Semitic languages, operative in accordance with an embodiment of the invention. In the method of FIG. 2, which may be carried out by the system of FIG. 1, a word from a Semitic language such as Hebrew or Arabic is scanned for affixes, preferably according to a predefined scanning sequence. The scanning sequence may, for example, require that the word be scanned first to determine if it includes a prefix that is found in a list of predefined prefixes, and then to determine if it includes a suffix that is found in a list of predefined suffixes, and finally to determine if it includes an infix that is found in a list of predefined infixes. Each scan of the word for an affix also preferably evaluates one or more predefined scanning criteria. The scanning criteria may, for example, require that when a particular affix is found, that the affix was not previously removed from the word, and/or that the word also be of a minimum character length, and/or that the affix meets at least one predefined distance criterion from an extent of said word, such as being found within, at, or beyond a predefined distance from the beginning or end of the word. Different scanning criteria may be predefined for different affix types or even for different affixes. The following table lists, by way of example, Hebrew affixes and their associated minimum word lengths (indicated by 'ML'), minimum distances from the end of the word (indicated by 'ME'), and indicators that a particular affix is to be removed from the word only once (indicated by "!").

TABLE A

| Affixes | | | | | |
|---|---|---|---|---|---|
| Prefixes | | Infixes | | Suffixes | |
| Bet | 4 ML | Vav | 2 ME! | Hay | 4 ML |
| Hay | 4 ML | Yod | 2 ME! | Vav | 4 ML |
| Vav | 3 ML | Tav | 3 ME! | Yod | 4 ML |
| Yod | 5 ML | | | Kaf | 5 ML |
| Kaf | 5 ML | | | Final Kaf | 5 ML |
| Lamed | 4 ML | | | Final Mem | 5 ML |
| Mem | 5 ML | | | Tav | 3 ML |
| Shin | 5 ML | | | | |

For example, when scanning a word for any of the prefixes in Table A, the scan is successful when the word includes one of the listed prefixes, such as the letter Bet, and when the word is of the minimum length indicated for the found prefix, such as 4 letters. Similarly, when scanning a word for any of the infixes in Table A, the scan is successful when the word includes one of the listed infixes, such as the letter Vav, when the infix is at or beyond a minimum distance from the end of the word, such as 2 letters, and provided that the infix was not previously removed from the word.

After the word is scanned for a particular affix type, if a predefined affix of the affix type is found, and the predefined scanning criteria, such as minimum word length, are met, the affix is removed from the word. Preferably, for each scan for a given affix type, all affixes of the affix type are removed from the word until no more affixes of the affix type are found, whereupon the remainder of the word is subsequently scanned for a different affix type. At any point during the scanning for any affix, one or more predefined termination criteria are preferably checked, such as whether whatever remains of the word is of a predefined character length, such as three letters. If the termination criteria are met, whatever remains of the word is considered to be a stem, and the scanning sequence may be terminated. If the termination criteria are not met, scanning of the remainder of the word continues with the next affix type in the scanning sequence, or with the beginning of the scanning sequence if the entire scanning sequence has been completed.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

What is claimed is:

1. A system for stemming words of Semitic languages, the system comprising:
    an affix scanner configured to
       scan a word of a Semitic language for at least one affix according to a predefined scanning sequence and
       determine if at least one predefined scanning criterion associated with said at least one affix is met after said at least one affix is found in said word; and
    a stemmer configured to remove said at least one affix from said word if said at least one predefined scanning criterion is met,
    wherein said at least one predefined scanning criterion is met when
       said at least one affix is not previously removed from the word, or
       said at least one affix is a predefined distance from beginning or end of the word.

2. The system according to claim 1 wherein said stemmer is configured to re-input said word from which said affix has been removed into said affix scanner if at least one predefined termination criterion is not met.

3. The system according to claim 1 wherein said stemmer is configured to output said word from which said affix has been removed as a stem of said word if at least one predefined termination criterion is met.

4. The system according to claim 3 wherein said predefined termination criterion is met when said word is of a predefined character length.

5. The system according to claim 1 wherein said predefined scanning sequence requires that said word be scanned first to determine if said word includes a prefix that is found in a list of predefined prefixes, and then to determine if said word includes a suffix that is found in a list of predefined suffixes, and finally to determine if said word includes an infix that is found in a list of predefined infixes.

6. The system according to claim 1 wherein said predefined scanning criterion is met when said affix is found and said word is of a minimum character length.

7. The system according to claim 1 wherein any of said affix scanner and said stemmer is embodied in a computer-readable medium for execution by a computer.

8. The system according to claim 1, wherein the predefined distance is a number of characters from the beginning or the end of the word.

9. A method for stemming words of Semitic languages, the method comprising:
    scanning a word of a Semitic language for at least one affix according to a predefined scanning sequence;
    determining, by a processor, if at least one predefined scanning criterion associated with said at least one affix is met after said at least one affix is found in said word; and
    removing said at least one affix from said word if said at least one predefined scanning criterion is met,
    wherein said at least one predefined scanning criterion is met when
       said at least one affix is not previously removed from the word, or
       said at least one affix is a predefined distance from beginning or end of the word.

10. The method according to claim 9 and further comprising performing any of said scanning, determining, and removing steps a plurality of times until at least one predefined termination criterion is met.

11. The method according to claim 9 and further comprising outputting said word, from which said affix has been removed, as a stem of said word if at least one predefined termination criterion is met.

12. The method according to claim 11 wherein said outputting stem comprises outputting if said word is of a predefined character length.

13. The method according to claim 9 wherein said scanning step in a first iteration of said scanning, determining, and removing steps comprises scanning said word to determine if said word includes a prefix that is found in a list of predefined prefixes, wherein said scanning step in a second iteration of said scanning, determining, and removing steps comprises scanning said word to determine if said word includes a suffix that is found in a list of predefined suffixes, and wherein said scanning step in a third iteration of said scanning, determining, and removing steps comprises scanning said word to determine if said word includes an infix that is found in a list of predefined infixes.

14. The method according to claim 9 wherein said determining step comprises determining that said word is of a minimum character length when said affix is found.

15. The method according to claim 9 wherein for each scan for a given affix type, all affixes of said affix type are removed from said word before said word is subsequently scanned for a different affix type.

16. The method according to claim 9, wherein the predefined distance is a number of characters from the beginning or the end of the word.

17. A non-transitory computer readable medium having stored thereon a computer program executable by a processor, the computer readable medium comprising:
    a first code segment operative to scan a word of a Semitic language for at least one affix according to a predefined scanning sequence;
    a second code segment operative to determine if at least one predefined scanning criterion associated with said at least one affix is met after said at least one affix is found in said word; and
    a third code segment operative to remove said at least one affix from said word if said at least one predefined scanning criterion is met,
    wherein said at least one predefined scanning criterion is met when
        said at least one affix is not previously removed from the word, or
        said at least one affix is a predefined distance from beginning or end of the word.

18. The non-transitory computer readable medium according to claim 17 wherein said code segments are operative to performing said scanning, determining, and removing steps a plurality of times until at least one predefined termination criterion is met.

19. The non-transitory computer readable medium according to claim 17 and further comprising a fourth code segment operative to output said word, from which said affix has been removed, as a stem of said word if at least one predefined termination criterion is met.

20. The non-transitory computer readable medium according to claim 19 wherein said fourth code segment is operative to output said stem if said stem is of a predefined character length.

21. The non-transitory computer readable medium according to claim 17 wherein said first code segment scanning step in a first iteration of executing said code segments is operative to scan said word to determine if said word includes a prefix that is found in a list of predefined prefixes, wherein said first code segment scanning step in a second iteration of executing said code segments is operative to scan said word to determine if said word includes a suffix that is found in a list of predefined suffixes, and wherein said first code segment scanning step in a third iteration of executing said code segments is operative to scan said word to determine if said word includes an infix that is found in a list of predefined infixes.

22. The non-transitory computer readable medium according to claim 17 wherein said second code segment is operative to determine that said word is of a minimum character length when said affix is found.

23. The non-transitory computer readable medium according to claim 17 wherein said third code segment is operative for each scan for a given affix type to remove all affixes of said affix type from said word before said word is subsequently scanned for a different affix type.

24. The non-transitory computer readable medium according to claim 17, wherein the predefined distance is a number of characters from the beginning or the end of the word.

* * * * *